United States Patent [19]

Graff et al.

[11] Patent Number: 5,196,800
[45] Date of Patent: Mar. 23, 1993

[54] APPARATUS AND METHOD FOR NON-CONTACT MEASUREMENT OF THE EDGE SHARPNESS OF A KNIFE

[75] Inventors: Ernest A. Graff, Ontario, N.Y.; Mathew J. Podhorecki, Clearwater, Fla.

[73] Assignee: Eastman Kodak Company, Rochester, N.Y.

[21] Appl. No.: 759,027

[22] Filed: Sep. 13, 1991

[51] Int. Cl.[5] .......................................... G01R 27/26
[52] U.S. Cl. ..................................... 324/662; 73/104; 340/680
[58] Field of Search ...................... 324/661, 662, 690; 73/104; 340/680

[56] References Cited
U.S. PATENT DOCUMENTS 2,472,994  6/1949  Vars ........................................ 73/104
3,641,431  2/1972  Pigage et al. ......................... 324/662
4,620,281  10/1986 Thompson et al. .................. 364/475
4,885,530  12/1989 Mayer et al. ............................ 73/104
4,958,129  9/1990  Poduje et al. ......................... 324/690
5,101,165  3/1992  Rickards ................................. 324/690

Primary Examiner—Jack B. Harvey
Assistant Examiner—Maura K. Regan
Attorney, Agent, or Firm—Francis H. Boos, Jr.

[57] ABSTRACT

Non-contact measurement of the sharpness of the cutting edge of a slitting or chopping knife is made repeatably placing a capacitance sensor probe symmetrically over the cutting edge at a predetermined distance (nominal offset) from the calibrated sharp edge of the knife and measuring the capacitance to derive a measurement that varies with knife wear (increasing knife edge radius). A novel sensor holder allowing for repeatable precision placement of the sensor.

9 Claims, 4 Drawing Sheets

APPARATUS AND METHOD FOR NON-CONTACT MEASUREMENT OF THE EDGE SHARPNESS OF A KNIFE

FIELD OF INVENTION

This invention relates to the field of measuring the sharpness of knife cutting edges, specifically industrial knives, using capacitance sensing as the measurement technique.

BACKGROUND

Several methods are known for measuring the sharpness of knives, for example, of the type used on slitters, choppers and other similar machines. Such machines are typically used in cutting webs, such as plastic sheet, film supports, cloth material and the like. One of the known methods is to take a plastic mold of the knife edge. When the mold has cured, it is removed from the knife and sliced with a razor. The knife profile is then viewed under a microscope to get a visual indication of the sharpness of the cutting edge of the knife. This requires that a specially trained technician make a subjective determination of the knife sharpness and the point at which the knife should be re-sharpened.

Another method is to use a small piece of lead on the end of a punch-like device. A technician places the lead directly over the cutting edge of the knife and strikes the punch, causing a small indentation in the lead corresponding to the knife profile. This lead model is then cut and the knife profile examined in a manner similar to the plastic mold method. In addition to the reliance on the subjective judgment of a trained technician, other problems with this method are that the results are dependent on the angle that the punch is held over the knife edge and the force with which the punch is struck. Additionally, there is the possibility that the knife edge can be damaged in the process.

Non-contact capacitance measurement techniques, in general, are also known. Examples are found in U.S. Pat. Nos. 3,641,431-Pigage et al and 4,620,281-Thompson et al. The '431 patent involves measurement of radial trueness of the position of cutter blades retained in an indexer of a gear cutting machine. A capacitance probe is mounted in a holder positioned adjacent the blades and measured capacitance of the air gap between the probe and the face or edge of the cutter blade is used to determine radial trueness of the blade position in the indexer. This arrangement does not measure sharpness of the cutting edge of the cutter blades, however. In the '281 patent, the condition of a cutting tool is sensed during the cutting operation by means of a capacitive sensor mounted on the cutting tool. The capacitive sensor is used to measure the distance between the tool sensor and the freshly cut surface of the workpiece being cut. Reduction in the measured distance provides an indication of nose wear of the cutting tool. Such an arrangement does not provide a direct measurement of knife sharpness. In addition, it assumes the ability to measure capacitance between the capacitive probe and a workpiece and, as such, is not suitable for use in directly measuring the sharpness of knives used in slitter and chopper equipment used for cutting webs and the like.

It is therefore an object of the present invention to provide a method and apparatus for measuring knife sharpness directly and in a non-contact manner.

It is a further object of the invention to provide non-contact knife sharpness measurement which is simple in structure and operation and provides repeatable measurement with a high degree of accuracy.

It is another object of the invention to provide non-contact knife sharpness measurement that directly measures the sharpness of the knife without relying on subjective judgment of a technician.

SUMMARY OF THE INVENTION

Thus, in accordance with the invention, apparatus is provided for measuring the sharpness of the cutting edge of a knife, wherein the cutting edge is formed nominally at a line of intersection between two converging cutting side surfaces defining an acute angle therebetween. The measuring apparatus comprises a capacitance sensor probe including an active sensor area having a principal reference plane useful in defining the spatial orientation of the active sensor area. The apparatus further comprises means for holding the active sensor area of the probe repeatably at a predetermined nominal offset from the cutting edge with the principal reference plane of the active sensor area substantially normal to a plane bisecting the acute angle formed between the side cutting surfaces of the knife and with the active sensor area substantially symmetrically positioned laterally with respect to such plane. The apparatus finally includes means for coupling the sensor probe to a capacitance measuring instrument whereby changes in sharpness of the cutting edge can be measured by changes in capacitance between the cutting edge and the sensor active area in successive measurements.

In the method of the invention, the degree of sharpness is measured of an elongated cutting edge of a knife wherein the cutting edge is generally at an intersection between two converging cutting faces of the knife which form an acute angle therebetween. The method of the invention comprises the steps of positioning a capacitance sensor probe having an active sensor area at a predetermined nominal offset from the cutting edge of the knife; orienting a principal reference plane of the active sensor area of the probe perpendicular to a plane bisecting the aforesaid acute angle. Preferably, the active sensor area has an elongate dimension in the principal reference plane and the method would then include the step of orienting the elongated dimension substantially in alignment with the lengthwise dimension of the cutting edge. Finally, the method includes the step of measuring the capacitance between the active sensor area of the probe and the cutting edge to determine wear of the cutting edge from a predetermined sharp condition.

DESCRIPTION

Figure 2:
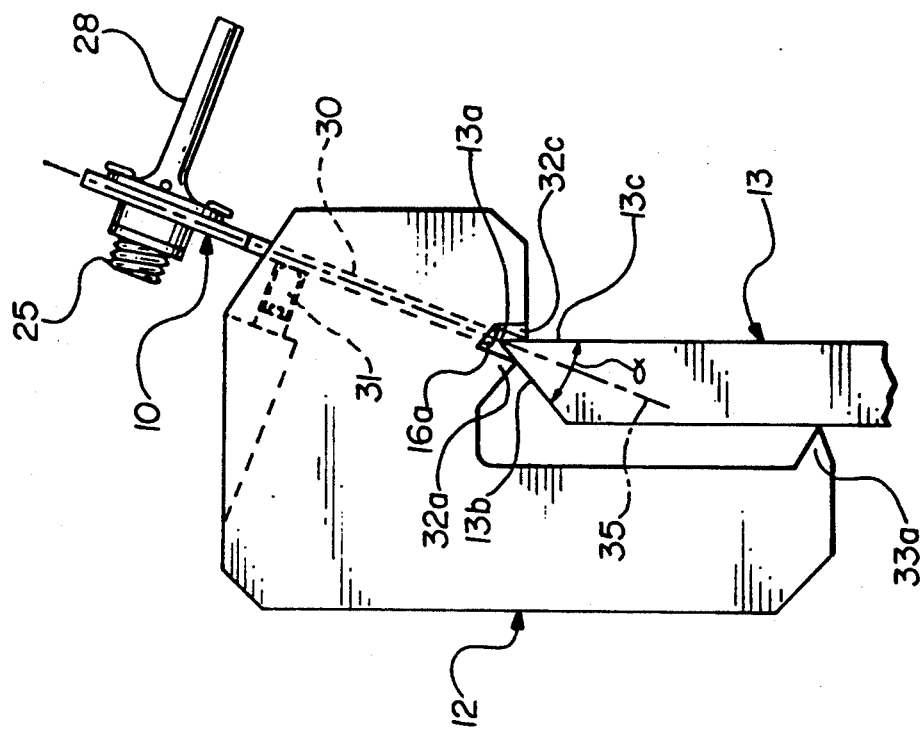
FIG. 2 is a side elevation view of the FIG. 1 measuring apparatus.
Figure 1:
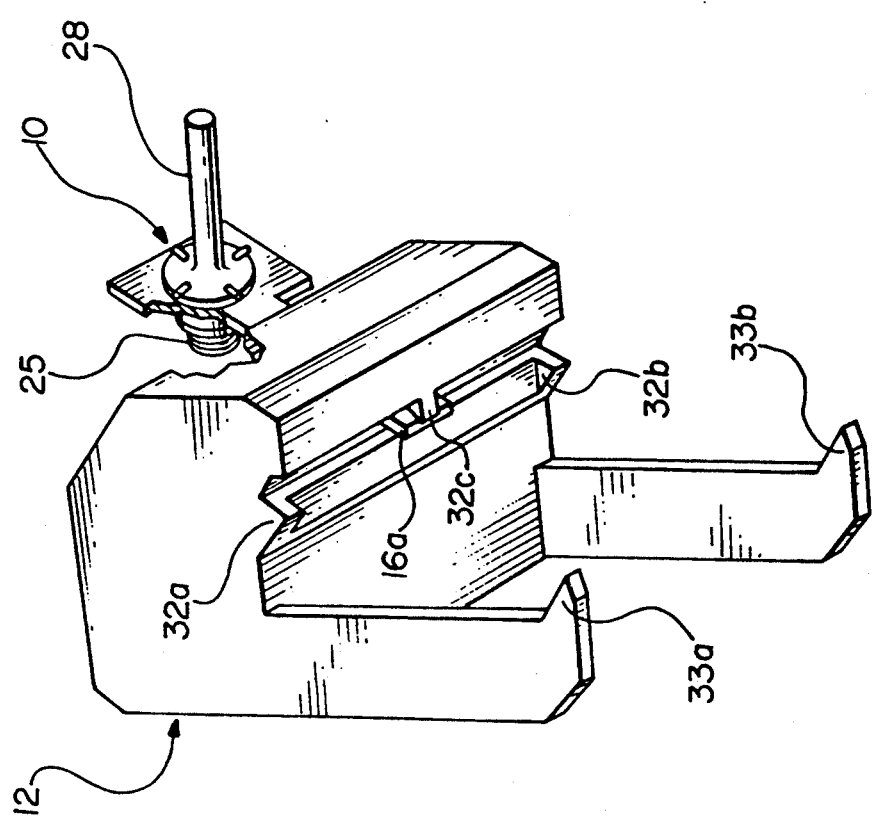
FIG. 1 is a perspective view from the bottom of knife sharpness measuring apparatus of the invention.
Figure 3:
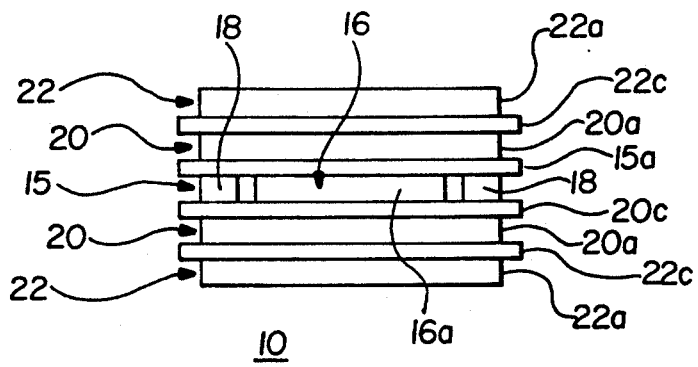
FIG. 3 is a schematic end view of a capacitive sensor probe useful in the apparatus of FIG. 1.
Figure 4A:
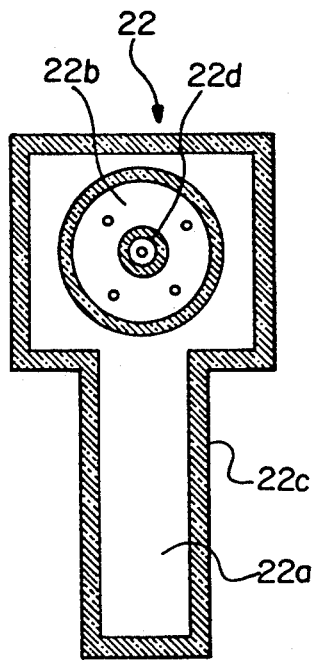
FIGS. 4a–4c are plan views of laminar components useful in the fabrication of the sensor probe of FIG. 3.
Figure 4B:
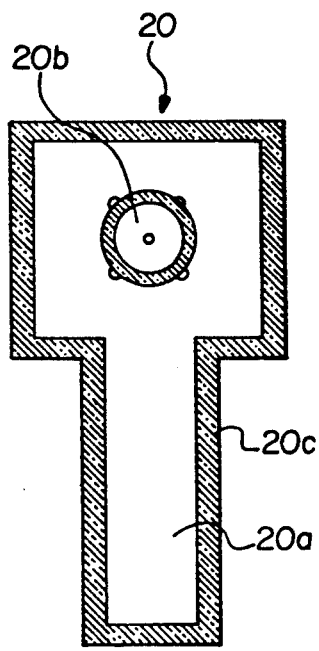
Figure 4C:
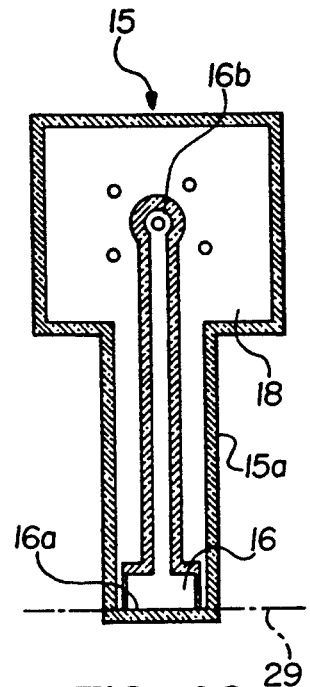
Figure 5:
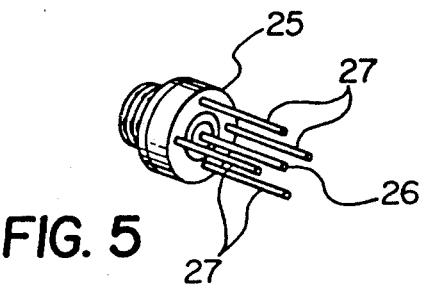
FIG. 5 is a perspective view of a coaxial connector useful in the fabrication of the sensor probe of the apparatus of FIG. 1.

Referring to FIGS. 1 and 2, knife sharpness measuring apparatus of the invention includes a capacitance sensor probe 10 and a holder 12 for positioning the sensor probe on the knife 13 to be measured. Knife 13 as shown in FIG. 2 includes a cutting edge 13a formed nominally at a line of intersection between converging side cutting surfaces 13b. and 13c which define an acute angle α therebetween. As shown in FIGS. 3 and 4a–4c, in a presently preferred form of the invention, sensor probe 10 is comprised of a plurality of sandwiched metallic laminations 15, 20 and 22 each of which is formed on a corresponding insulative, adhesive substrate 15a, 20c and 22c. These substrates serve as bonding agents when the laminates are sandwiched together to form the completed sensor assembly and as electrical insulation between adjacent laminates. In the fabrication process, the central lamination 15, shown in FIG. 4c, is preferably made of copper and is etched by known techniques to form a capacitance sensor 16 terminating at one end in an active sensor area 16a perpendicular to the sheet of the drawing and at the other end in an electrical contact terminal 16b. A shield area 18 is formed on laminate 15 to provide an active lateral shield along the edges of capacitance sensor 16. In FIG. 4b, laminate 20, of which two are required and preferably also made of copper, is etched as shown to provide outer active shield areas 20a to shield the face areas of capacitance sensor 16. An isolated central area 20b is formed which will eventually be electrically connected to contact terminal 16b. A pair of laminates 22, preferably made of stainless steel, are etched as shown in FIG. 4a to form an outer ground shield for sensor probe 10 which will be electrically in contact with knife 13 via holder 12 and which serves to isolate the sensor 16 and shields 20 from the surrounding environment. After bonding the laminations together as shown in FIG. 3, holes 23 and 24 are drilled to provide electrical connection to central capacitance sensor 16 and to the active shield areas 18 and 20a. For this purpose, a central capacitance sensor connector wire 26 and peripheral active shield connector wires 27 of a threaded coaxial connector 25 (FIG. 5) are inserted into holes 23 and 24, respectively, and soldered in place. Terminals 27 are connected on the reverse side of sensor 16 to a shield cap 28.

The active sensor area 16a at the end of sensor probe 10 is preferably created by precision cutting with a diamond cutter along line 29 (FIG. 4a). When cut, the active sensor area 16a. is then defined by a principal reference plane which corresponds in FIG. 3 to the plane of the drawing sheet. In FIG. 4c, the principal reference plane is perpendicular to the plane of the drawing sheet and coincident with the elongated axis or dimension of area 16a represented by line 29.

Referring again to FIGS. 1 and 2, holder 12 functions as a gauge body to hold the active capacitance sensor area 16a repeatably in proper orientation relative to the cutting edge of the knife 13 for capacitance measurement purposes. More specifically, holder 12 is provided with an internal slot 30 and set screw 31 for receiving and fixedly holding the laminated sensor probe 10 in the holder. Outer knife contact projections 32a, 32b and center knife contact projection 32c straddle the capacitance probe active sensor area 16a and are adapted to contact knife surfaces 13b, 13c simultaneously to position the active sensor area 16b at a predetermined nominal offset distance from the knife cutting edge and to substantially align the elongated axis of sensor area 16a with the lengthwise dimension of the cutting edge of the knife 13. Although any number of contacts may be used, a three point contact is preferred for the inherent stability it provides to the gauge body when positioned on the knife cutting surfaces 13b, 13c. Holder 12 is further provided with an additional pair of contact projections 33a and 33b spaced significantly from the first set of contact projections 32a–32c for contacting knife 13 at a position remote for the cutting surfaces for holding the principal reference plane of the sensor area 16a perpendicular to a plane 35 bisecting the acute angle α formed by the convergence of the cutting surfaces 13b, 13c of the knife. Holder 12 is preferably made from an electrically conductive material, such as stainless steel, so as provide electrical contact between the ground plane represented by the knife and the outer ground shields 22 of sensor 10.

It can be shown that when a capacitive probe, such as the active sensor area 16a of sensor 16, is suitably placed over the cutting edge of knife 13, a capacitance measuring instrument connected to that probe with the knife at ground potential will read a capacitive value that depends on the geometry of the probe, the nominal distance from the probe active area to the knife edge and the geometry of the knife edge in accordance with the relationship:

$$C = KA/d$$

where:

$C$ = capacitance $K$ = a constant $A$ = active measurement area $d$ = distance between the sensor and target (ground point).

Thus with the probe geometry fixed and a probe holder such as described above designed to place the sensor active area repeatably over the knife cutting edge in a fixed orientation, the only variable is the knife geometry.

Figure 6:
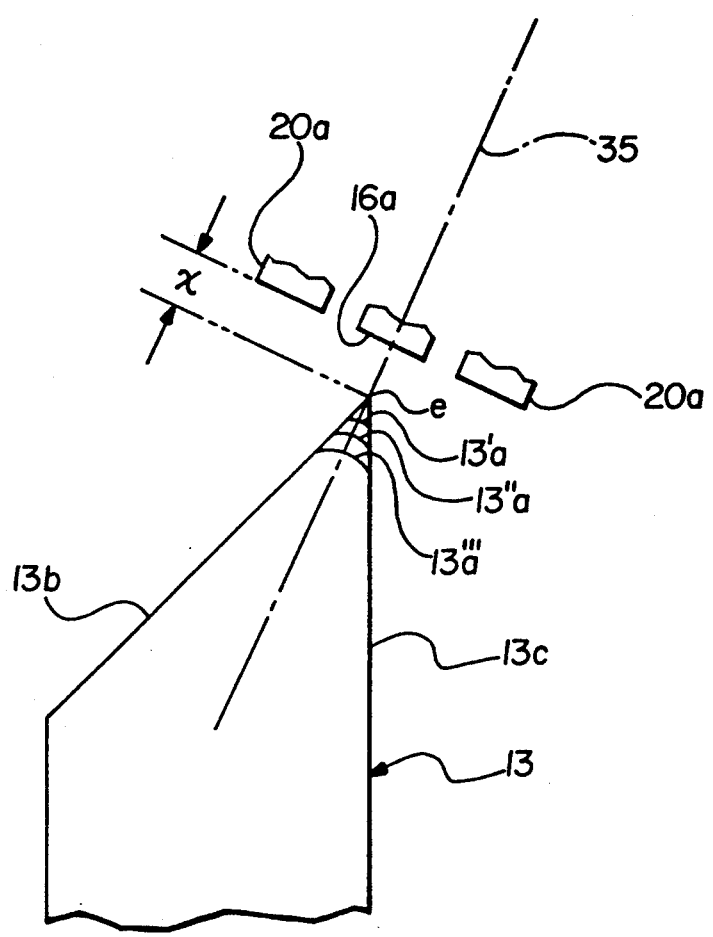
FIG. 6 is schematic representation of a sensor probe and knife edge useful in describing the present invention.
Figure 7:
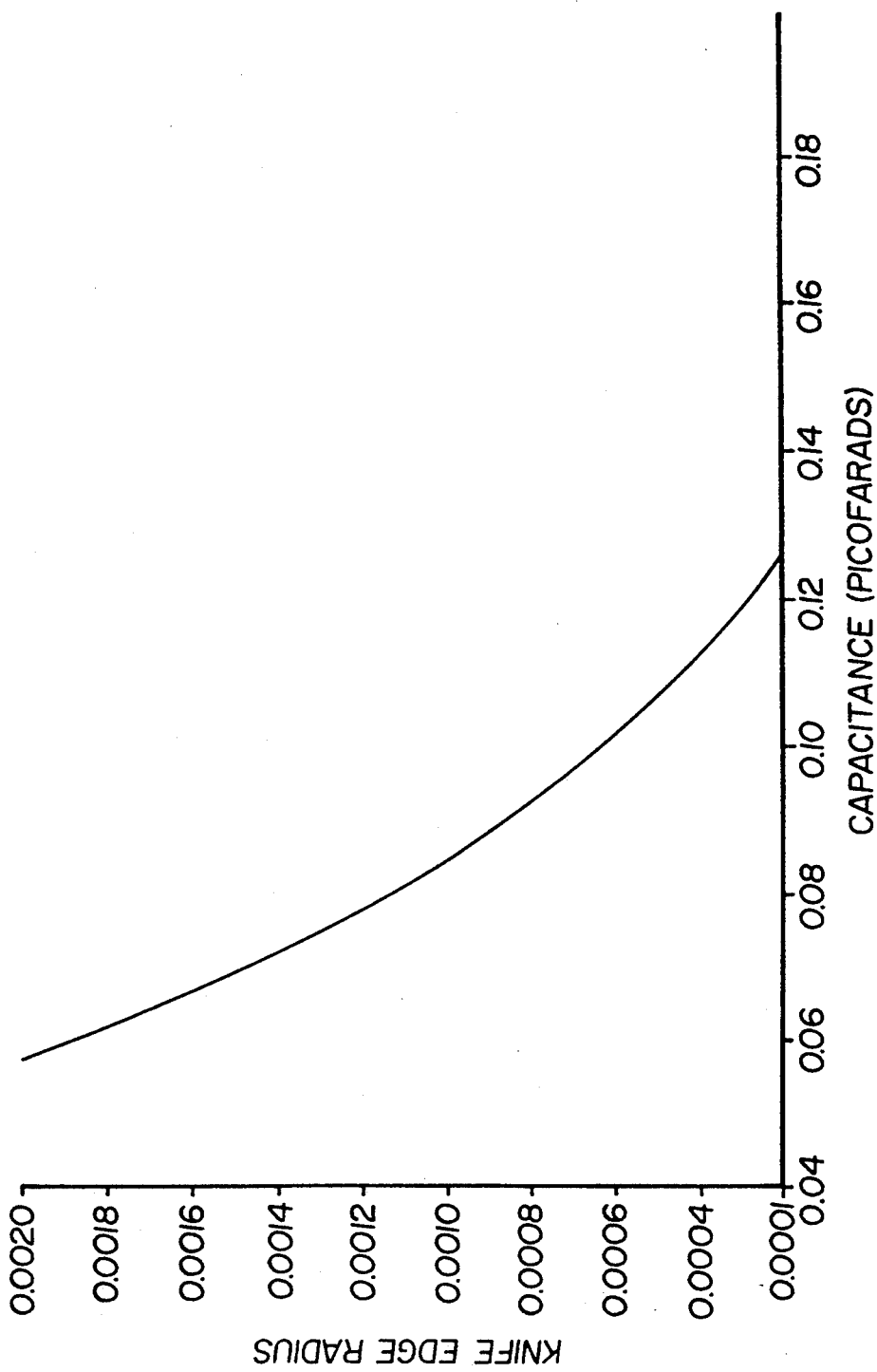
FIG. 7 is a graph of measurement characteristics of the apparatus of FIG. 1.

Referring to FIG. 6 the relationship of the active sensor area 16a to the knife cutting edge is shown schematically with sensor area 16a positioned at a nominal offset, x, from the actual line of intersection e of the converging side surfaces 13b and 13c of the knife. The cutting edge 13a of a theoretically perfectly sharpened would coincide with this line. In actuality, a freshly sharpened knife edge would have some finite radius as shown by edge 13a'. It can be seen that as the knife edge wears during repeated cutting operations, the edge radius increases and the the average distance from the sensor active area 16a to the worn knife edges 13a" and 13a'" correspondingly increases with a consequent decrease in capacitance measurement. Thus, a probe repeatably placed over the cutting edge of knife at a fixed nominal distance from the knife edge (nominal offset) will have a capacitance value that will vary with changes in knife radius caused by knife wear. FIG. 7 illustrates the manner in which measured capacitance, in picofarads, varies as a function of knife radius.

In the performance of the method of the invention, sensor 10 is initially placed over a knife edge of a known degree of sharpness and positioned at a predetermined nominal offset from the cutting edge with the principal plane of the sensor active area normal to the plane bisecting the acute angle of the knife edge and with an elongated dimension of the active sensor area aligned with the cutting edge. The capacitance of this arrangement is measured to form a baseline measurement corresponding to a "sharp" knife. Then as the knife is used in slitting or chopping operations, the sensor is periodically re-placed in this same position over the knife edge and capacitance measurement taken. The measurement can then be compared to a pre-calibrated graph of the type shown in FIG. 7, or else the capacitance reading can be digitized and fed to a microcomputer having a lookup table in memory with appropriate values which can then be converted to a visual readout of appropriate type, such as actual knife radius or percent degree of sharpness.

It will be appreciated that the geometry of the active sensor area 16a may be other than the elongated rectangle shown in FIG. 3. For example, an oval, circle or diamond shaped active area may be used. However, at present, the rectangular shape represents the presently preferred mode of practicing the invention due at least in part to the fact that it lends itself to easy fabrication of the sensor using the laminar fabrication process described above. In addition, due to the fact that an ultra narrow rectangle is more readily confined to the actual cutting edge, a more sensitive measurement of an average capacitance along an extended length of the knife cutting edge can be obtained.

The invention has been described in detail with particular reference to a presently preferred embodiment, but it will be understood that variations and modifications can be effected within the spirit and scope of the invention.

What is claimed is:

1. Apparatus for measuring the sharpness of the cutting edge of a knife, the cutting edge being formed at the line of intersection between two converging side cutting surfaces defining an acute angle between the surfaces, the apparatus comprising:

a capacitance sensor probe having an active sensor area, the sensor area having a principal reference plane;

means for holding said active sensor area repeatably at a predetermined nominal offset from said cutting edge with the principal reference plane of the active sensor area substantially normal to a plane bisecting the acute angle formed between said side cutting surfaces;

and means for coupling the central sensor lamination of said active sensor area to a capacitance measuring-instrument, whereby changes, in sharpness of the cutting edge are measured by changes in capacitance between the cutting edge and the sensor active area in successive measurements.

2. The apparatus of claim 1 in which said holding means is further adapted to hold said active sensor area substantially symmetrically positioned laterally with respect to said plane 3. The apparatus of claim 1 wherein said capacitance sensor probe comprises a laminated sensor.

4. The apparatus of claim 3 wherein said sensor probe includes a central capacitance sensor lamination having an elongated active sensor area and wherein said holder means is adapted to hold an elongated dimension of said active sensor area in alignment with a lengthwise dimension of said cutting edge.

5. The apparatus of claim 1 in which said holder includes a first plurality of knife contacting projections straddling said active sensor area and adapted to contact said side cutting surfaces adjacent said cutting edge for holding said active sensor area at said predetermined nominal offset.

6. The apparatus of claim 3 in which said sensor probe includes a central capacitance sensor lamination having an elongated active sensor area and said holder includes a first plurality of knife contacting projections straddling said active surface area and adapted to contact said side cutting surfaces adjacent said cutting edge for holding an elongated dimension of said sensor area in substantial alignment with a lengthwise dimension of said cutting edge.

7. The apparatus of claim 1, 5 or 6 in which said holder includes means for contacting the knife at a position remote from said side cutting surfaces for holding said principal reference plane of the active sensor area perpendicular to said plane bisecting the acute angle between the cutting surfaces.

8. A method of measuring the degree of sharpness of an elongated cutting edge of a knife the cutting edge being at an intersection between two converging side cutting surfaces of the knife forming an acute angle therebetween, the method comprising the steps of:

positioning a shielded capacitance sensor probe having an active surface area at a predetermined nominal offset from the cutting edge of the knife,;

orienting a principal reference plane of said active sensor area orthogonally of a plane bisecting said acute angle;

and measuring the capacitance between said active sensor area and the cutting edge to determine sharpness of the cutting edge.

9. The method of claim 8 wherein said active sensor area comprises an elongated area, the method further including the step of orienting an elongated dimension of the active surface area substantially in alignment with the cutting edge.

* * * * *